May 11, 1926. F. P. DINKELBERG 1,584,517
APPARATUS FOR HANDLING AND STORING AUTOMOBILES
Filed Feb. 19, 1923 13 Sheets-Sheet 1
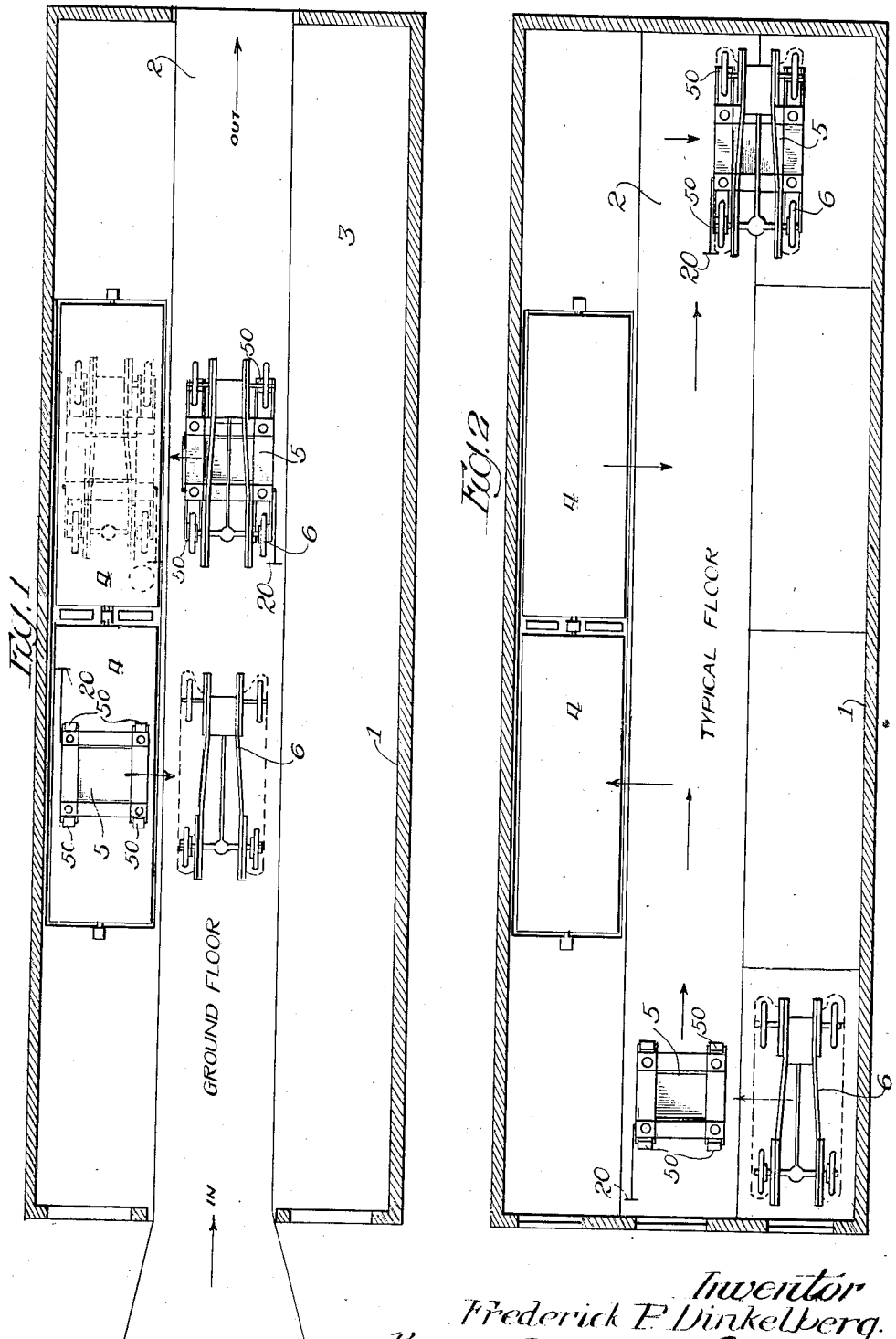
Inventor
Frederick P. Dinkelberg.
By Parker & Carter Attys.

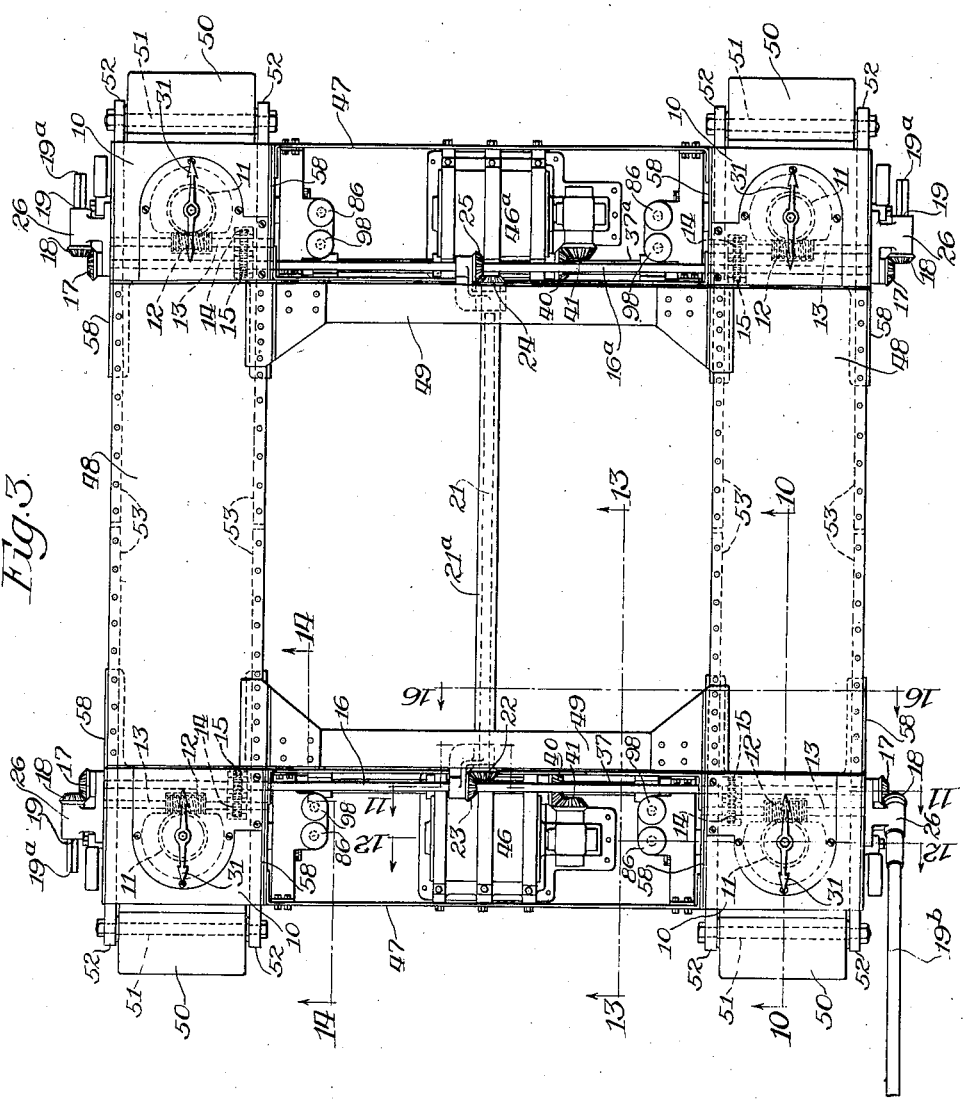

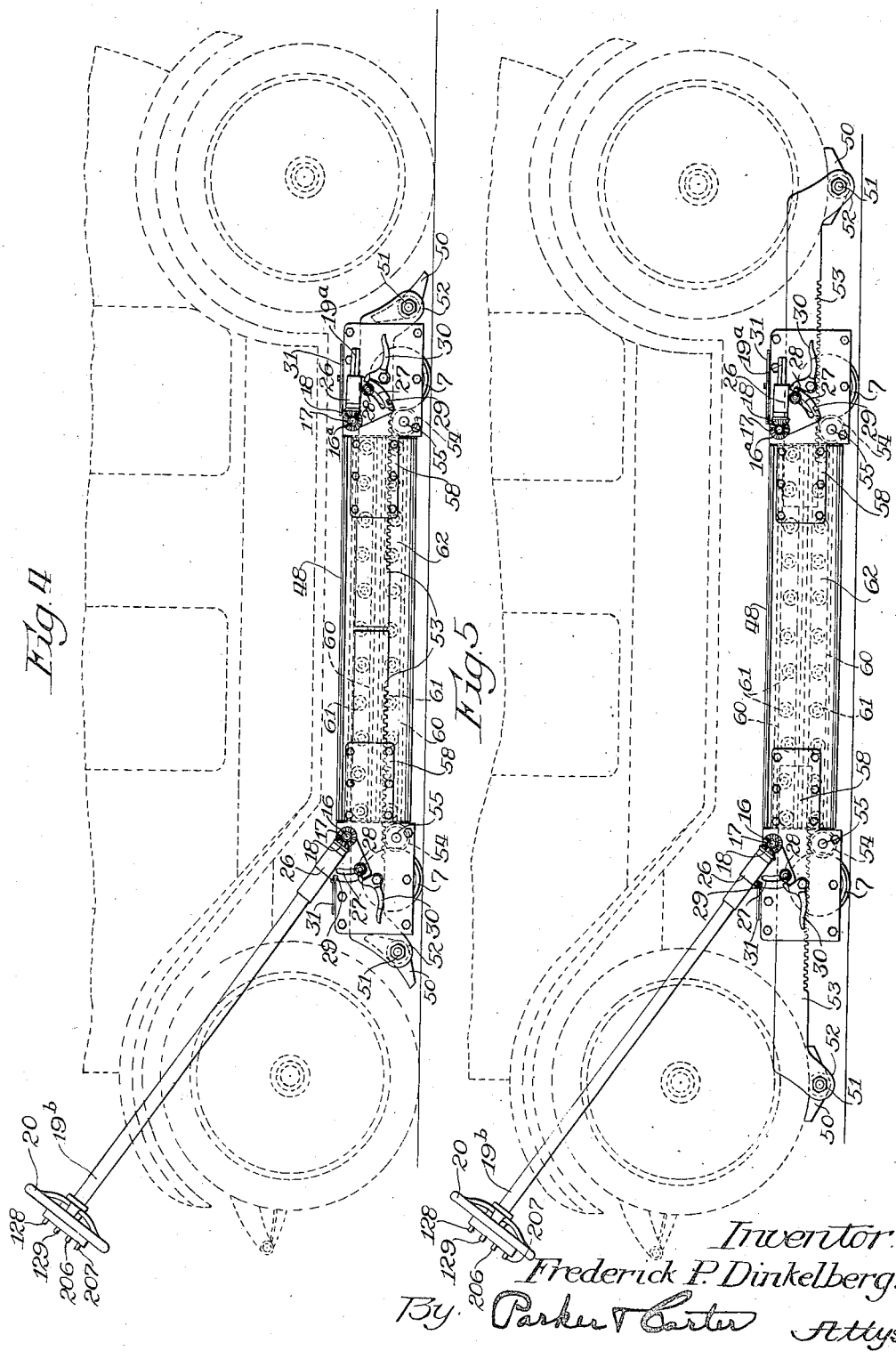

May 11, 1926. F. P. DINKELBERG 1,584,517
APPARATUS FOR HANDLING AND STORING AUTOMOBILES
Filed Feb. 19, 1923 13 Sheets-Sheet 4

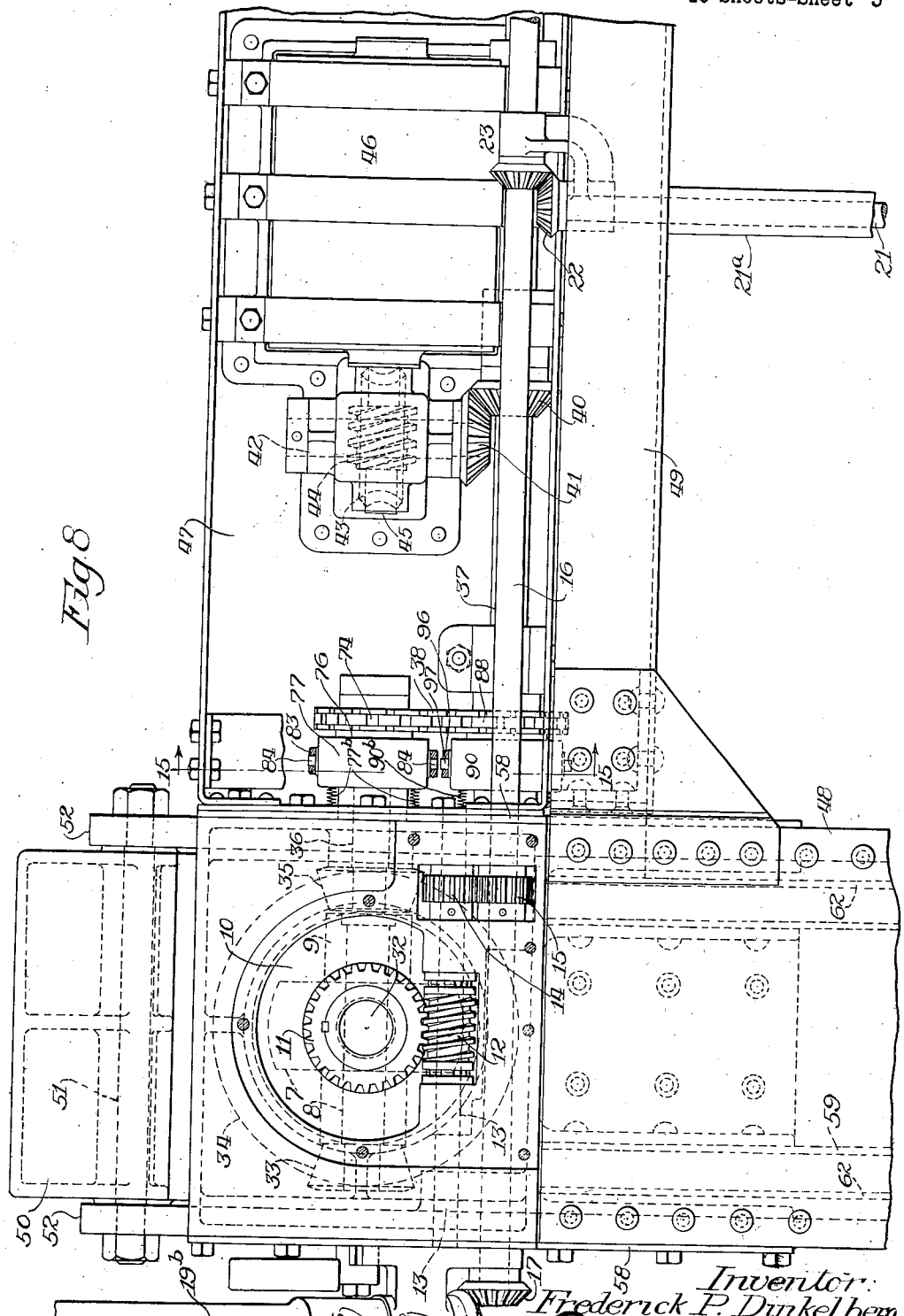

May 11, 1926. F. P. DINKELBERG 1,584,517
APPARATUS FOR HANDLING AND STORING AUTOMOBILES
Filed Feb. 19, 1923     13 Sheets-Sheet 6
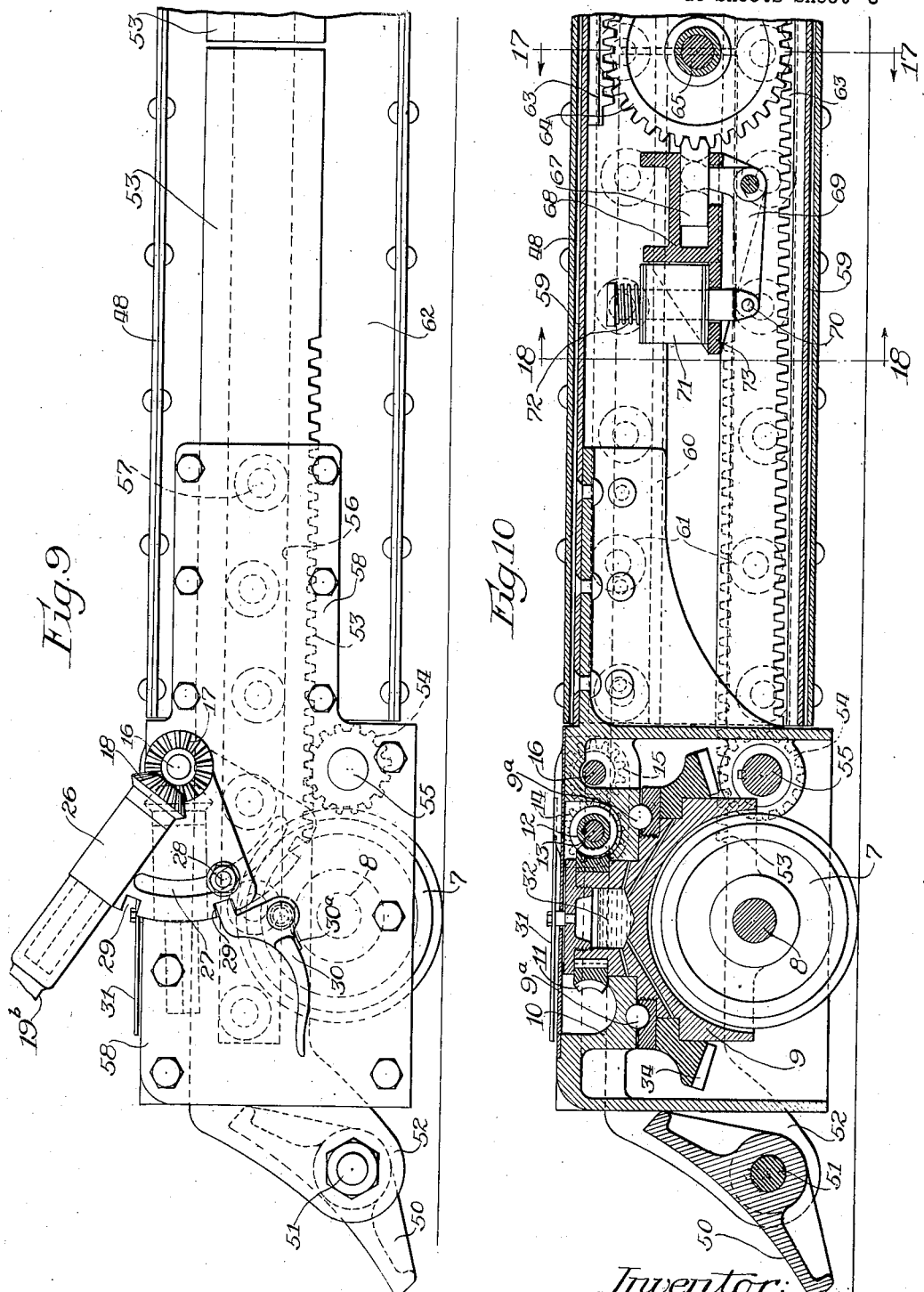
Inventor:
Frederick P. Dinkelberg.
By Parker & Carter Attys

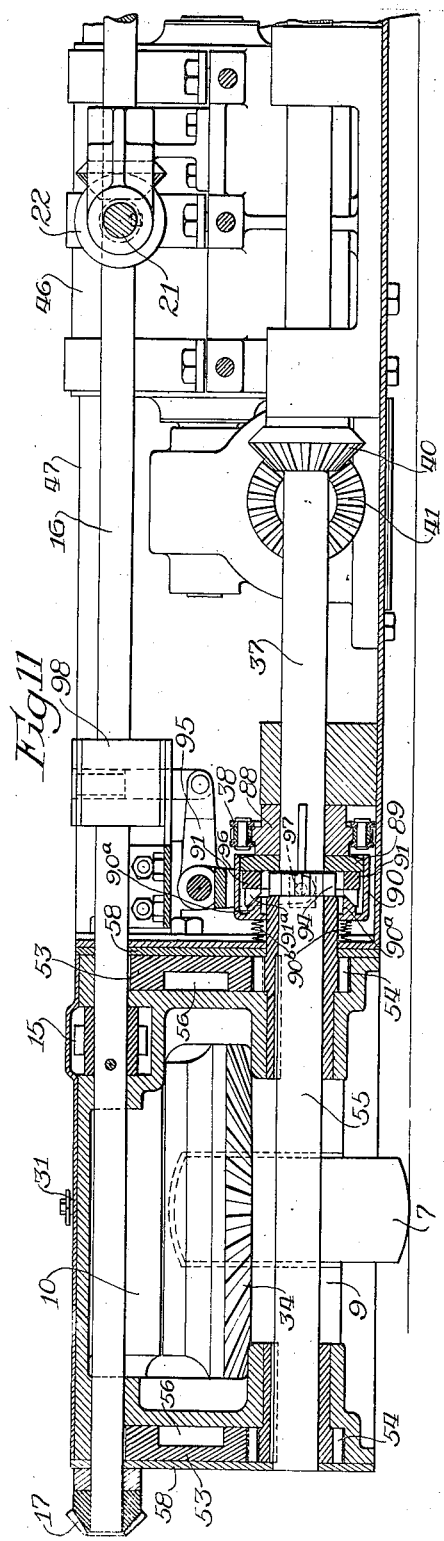

May 11, 1926. F. P. DINKELBERG 1,584,517
APPARATUS FOR HANDLING AND STORING AUTOMOBILES
Filed Feb. 19, 1923 13 Sheets-Sheet 8
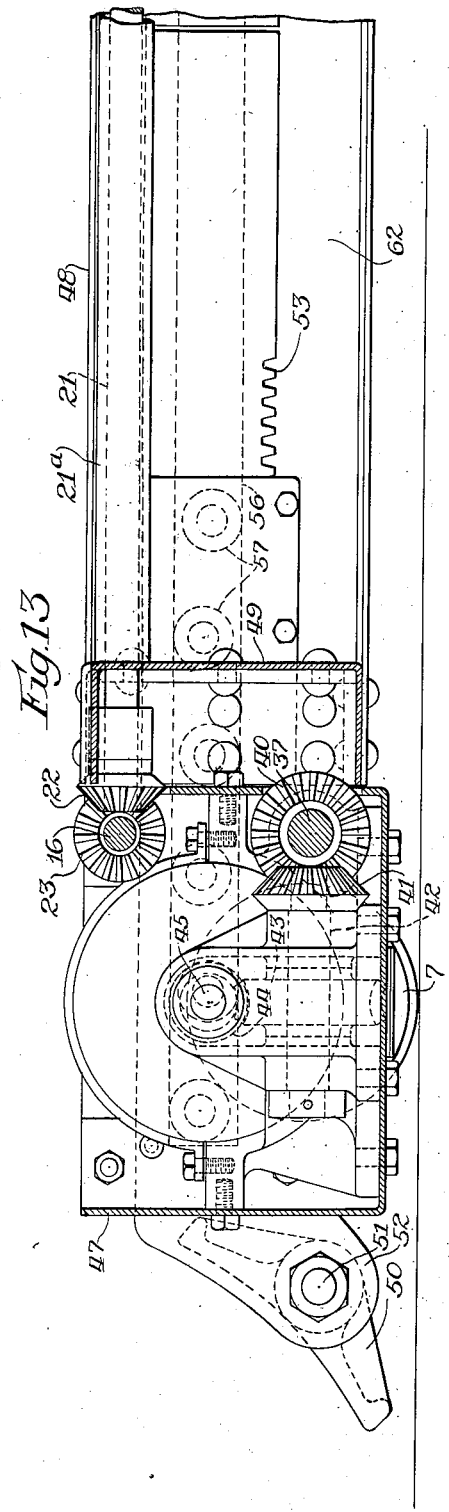
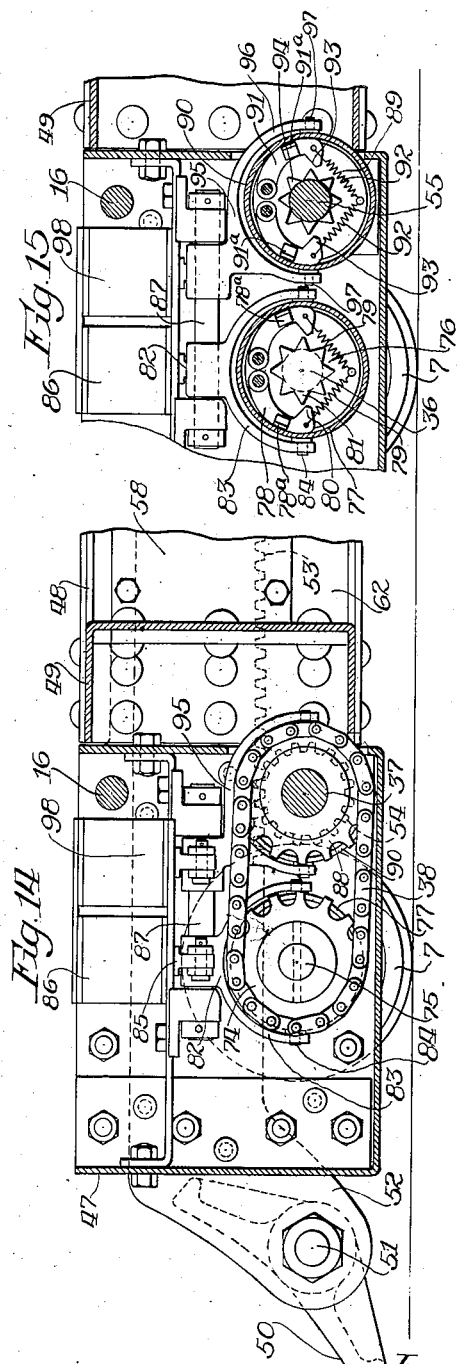
Inventor:
Frederick P. Dinkelberg.
By Parker & Carter Attys.

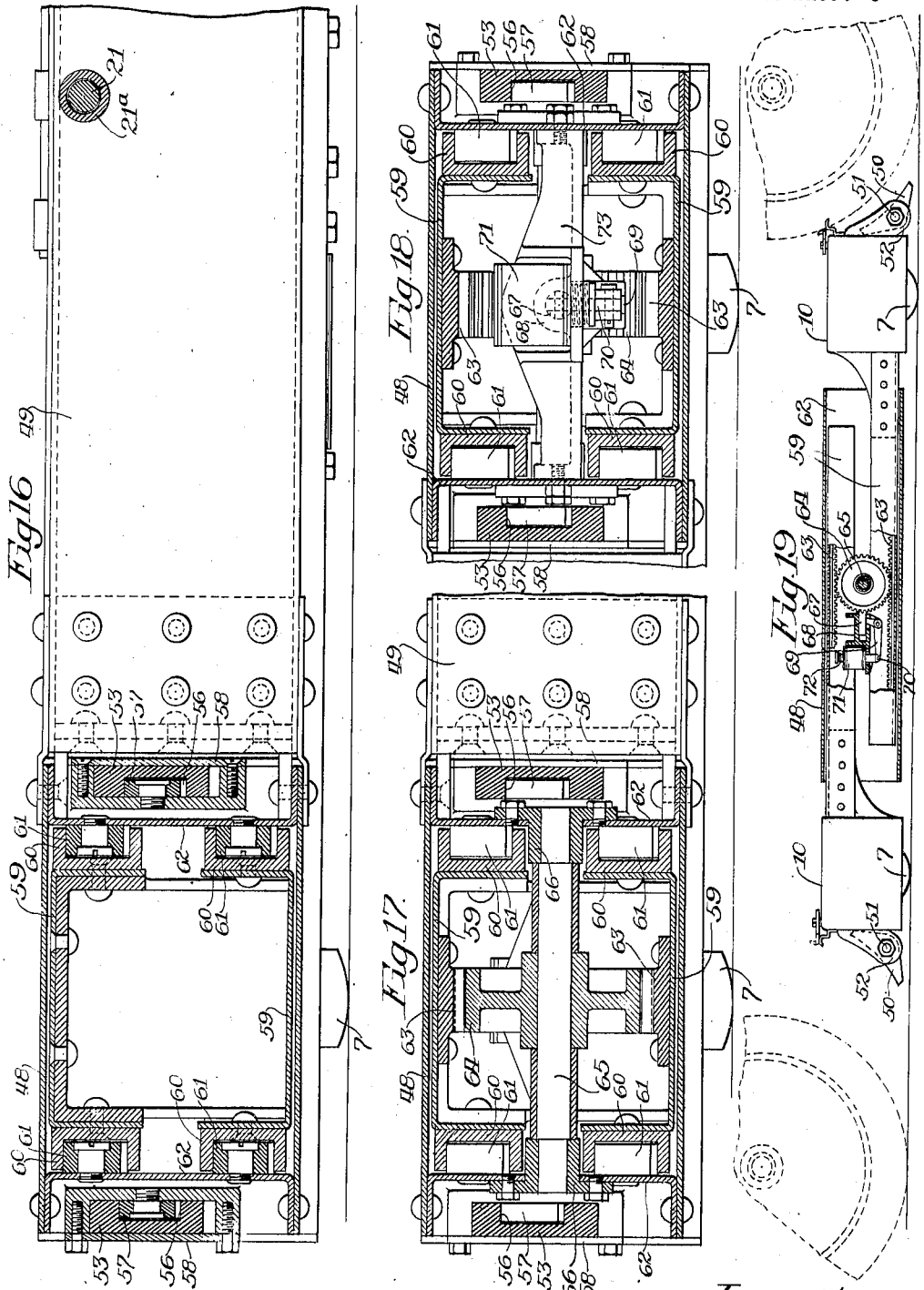

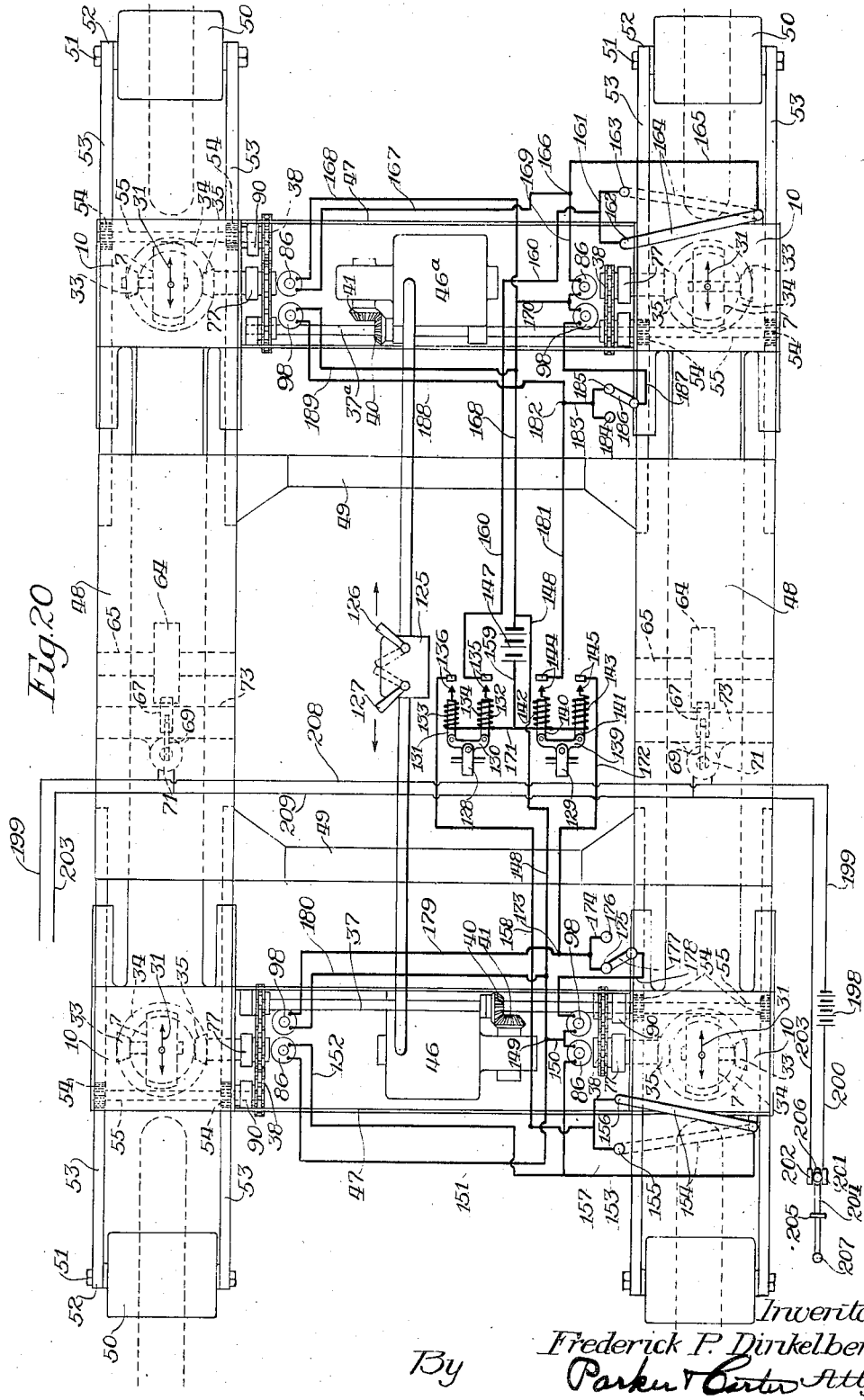

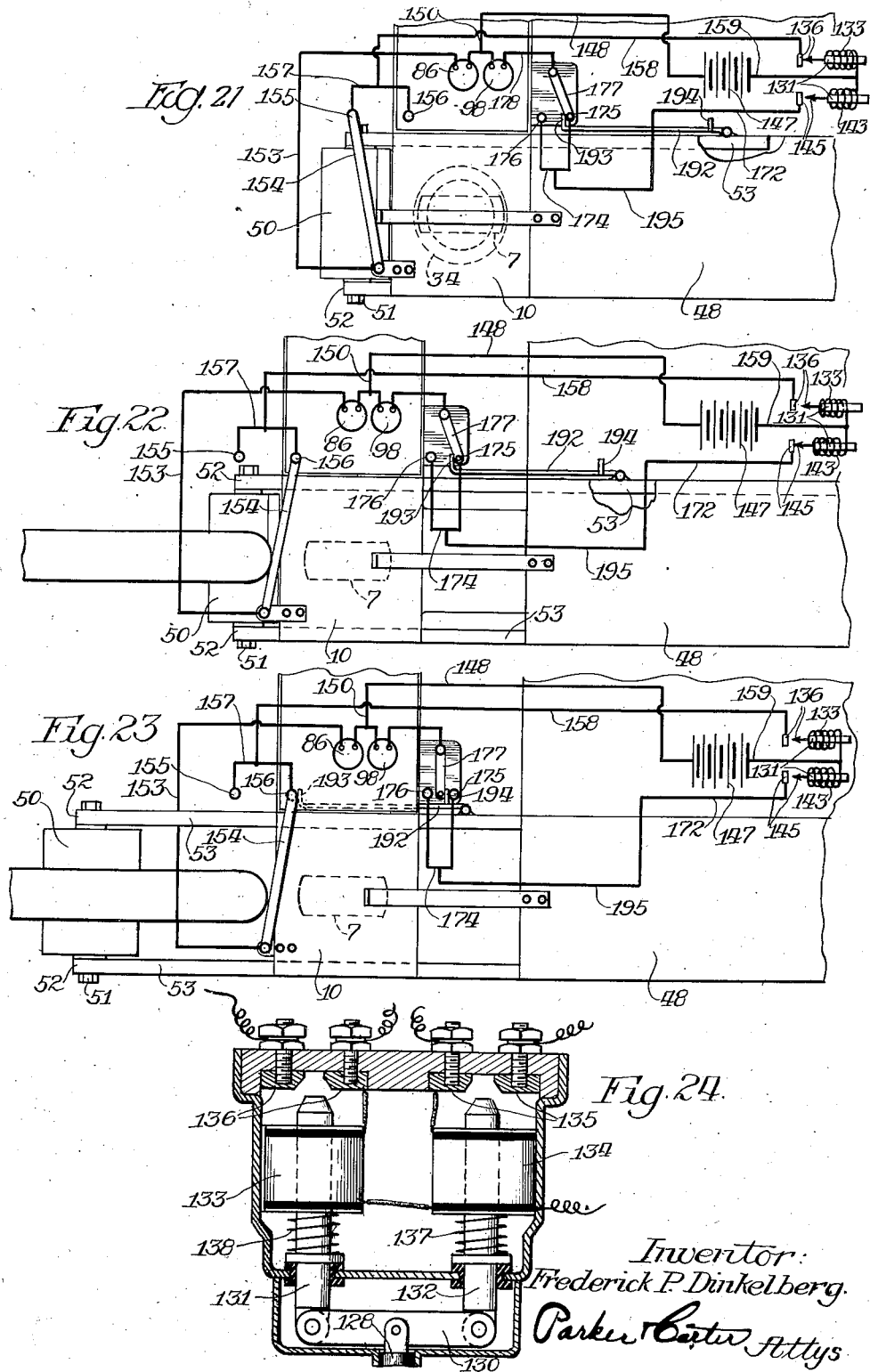

May 11, 1926. F. P. DINKELBERG 1,584,517
APPARATUS FOR HANDLING AND STORING AUTOMOBILES
Filed Feb. 19, 1923
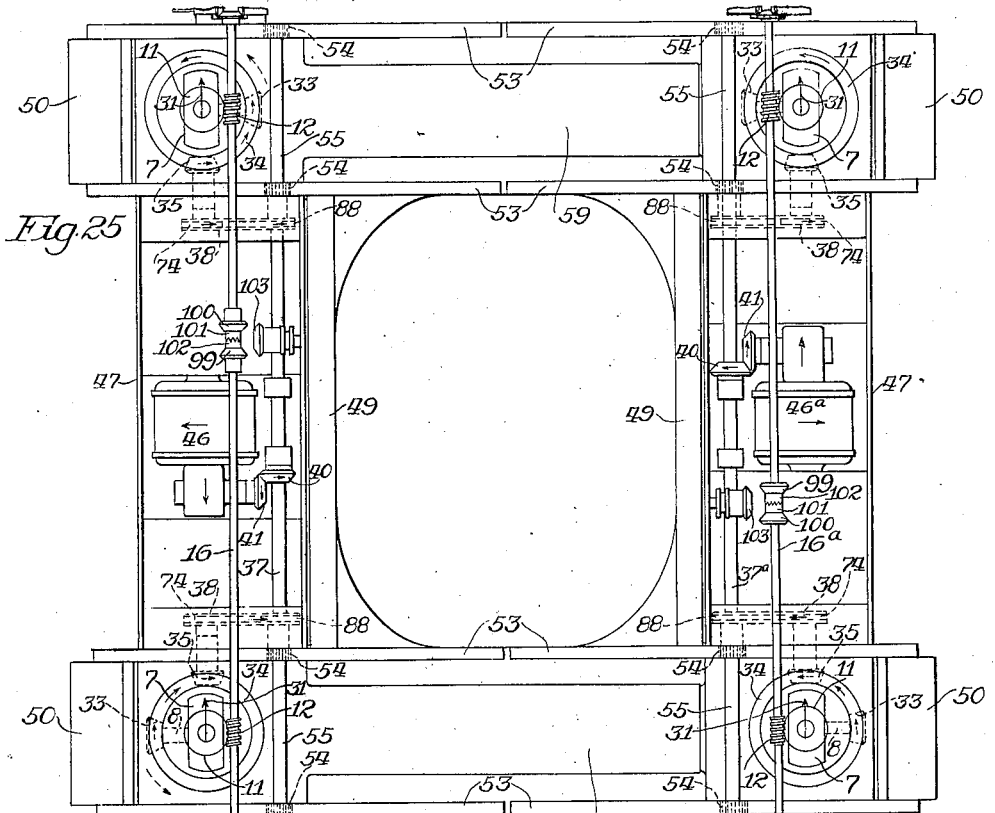
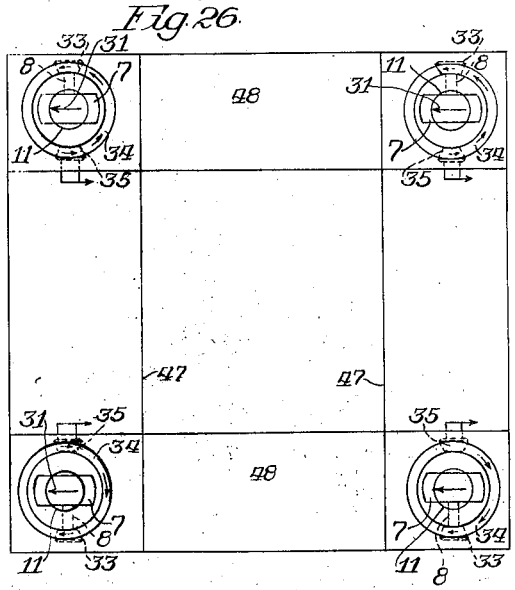
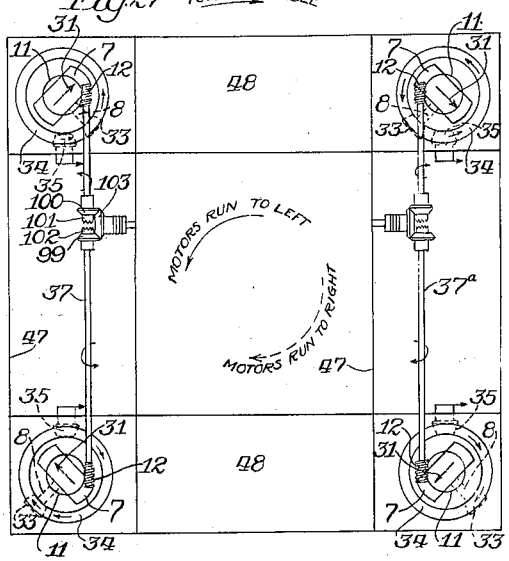

May 11, 1926.  F. P. DINKELBERG  1,584,517
APPARATUS FOR HANDLING AND STORING AUTOMOBILES
Filed Feb. 19, 1923   13 Sheets-Sheet 13
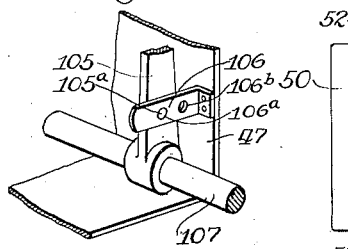
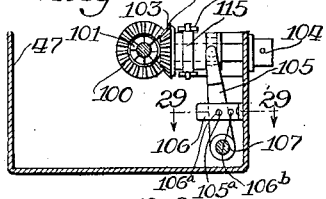
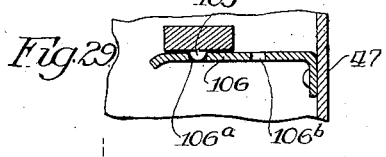
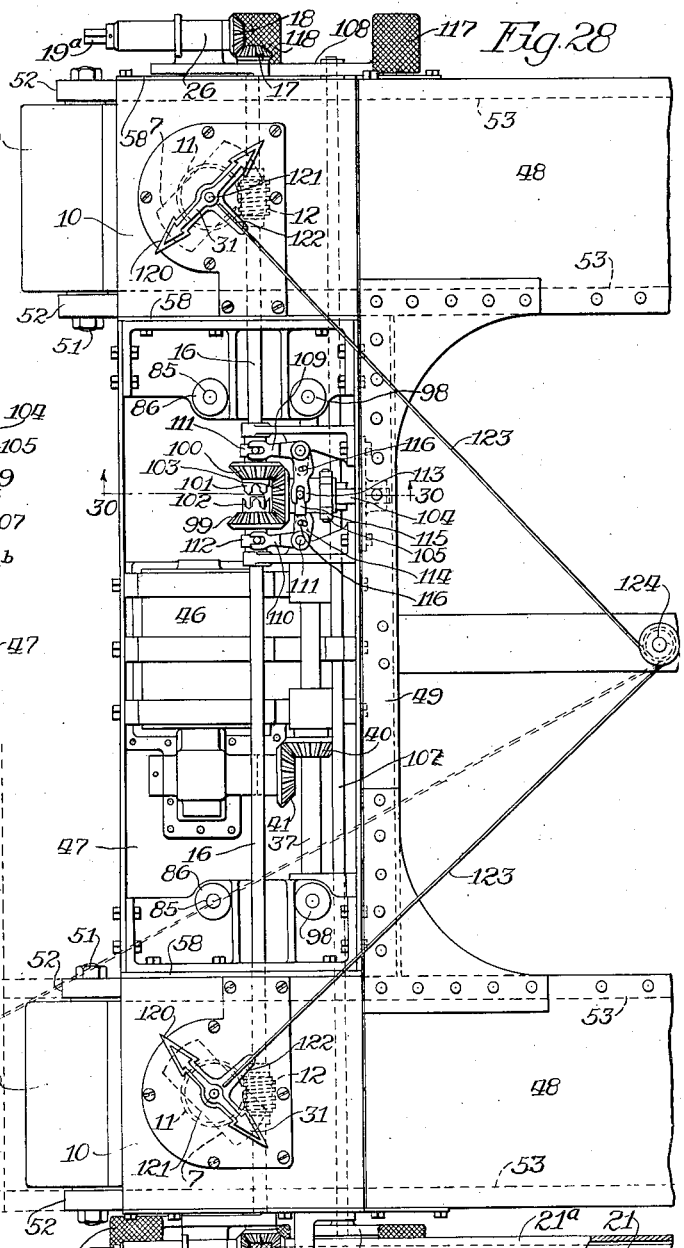

Patented May 11, 1926.

1,584,517

UNITED STATES PATENT OFFICE.

FREDERICK P. DINKELBERG, OF EVANSTON, ILLINOIS.

APPARATUS FOR HANDLING AND STORING AUTOMOBILES.

Application filed February 19, 1923. Serial No. 620,118. REISSUED

This invention relates to an apparatus for handling and storing automobiles and has for its object to provide a new and improved efficient apparatus of this description. In view of the large number of automobiles now in use and the congested condition of the streets it is very desirable to provide some means of easily, quickly and efficiently storing them at points where access to them can be easily and quickly secured. The invention has among other objects to provide an efficient apparatus by means of which automobiles of all sizes can be easily, quickly and efficiently transported and stored in buildings with a number of stories or a single story and can be easily and quickly removed. Another object of the invention is to provide means for handling the automobiles in a comparatively small space so that they can be moved about and into and out of their storage spaces quickly and effectively thereby permitting the storage of a large number of automobiles in a short time and in a comparatively small space and effectively using such space. Another object of the invention is to provide a carrying device or truck for efficiently handling automobiles in a small space which can be moved under the automobile and will then lift it from the floor and transport it into its storage space and then release it, the transporting device itself passing into the storage space to deposit the automobile therein or remove it therefrom. The invention has other objects which are more particularly pointed out in the following description.

Referring now to the drawings:

Fig. 1 is a ground floor plan of one form of building showing the method of use of the apparatus.

Fig. 2 is a typical floor plan above the ground floor.

Fig. 3 is a plan view of one form of truck used for the handling of the automobiles.

Fig. 4 is a side elevation showing the truck under an automobile having a short wheel base before the automobile is lifted from the floor, the automobile being shown in dotted lines.

Fig. 5 is a view similar to Fig. 4 showing the automobile lifted from the floor.

Fig. 6 is a side elevation showing the truck beneath an automobile with a long wheel base before the automobile is lifted from the floor.

Fig. 7 is a view similar to Fig. 6 after the automobile is lifted from the floor.

Fig. 8 is an enlarged plan view showing one of the corner sections of the truck.

Fig. 9 is an enlarged side elevation showing one of the corner sections of the truck.

Fig. 10 is a sectional view taken on line 10—10 of Fig. 3.

Fig. 11 is an enlarged sectional view taken on line 11—11 of Fig. 3.

Fig. 12 is an enlarged sectional view taken on line 12—12 of Fig. 3.

Fig. 13 is an enlarged sectional view taken on line 13—13 of Fig. 3.

Fig. 14 is an enlarged sectional view taken on line 14—14 of Fig. 3.

Fig. 15 is a sectional view taken on line 15—15 of Fig. 8.

Fig. 16 is an enlarged sectional view taken on line 16—16 of Fig. 3.

Fig. 17 is a sectional view taken on line 17—17 of Fig. 10.

Fig. 18 is a sectional view taken on line 18—18 of Fig. 10.

Fig. 19 is a longitudinal sectional view of one of the side members of the truck.

Fig. 20 is a diagrammatic view showing the electrical connections when the truck is operated by electricity.

Fig. 21 is a diagrammatic view showing a portion of the electric controlling circuits for controlling the movement of the frame pieces carrying the wheels and before the movement has started.

Fig. 22 is a view similar to Fig. 21 after the parts have moved to engage the wheel of the automobile and move one of the automatic switches.

Fig. 23 is the same as Fig. 22 wherein the parts have moved sufficient to move both of the automatic switches.

Fig. 24 is a sectional view through the casing of one of the controlling push button contact switches.

Fig. 25 is a plan view with parts omitted showing a construction by means of which the truck can be moved about its vertical central axis.

Fig. 26 is a diagrammatic view showing the device of Fig. 25 indicating the position of the wheels when the truck is moving in straight lines.

Fig. 27 is a view similar to Fig. 26 showing the position of the wheels when the truck is moving about its central vertical axis.

Fig. 28 is an enlarged view of one end of the device shown in Fig. 25 illustrating the details of the various parts.

Fig. 29 is a sectional view taken on line 29—29 of Fig. 30.

Fig. 30 is a sectional view taken on line 30—30 of Fig. 28.

Fig. 31 is an enlarged perspective view of the clutch controlling arm.

Fig. 32 is a side elevation of the device shown in Fig. 28.

Like numerals refer to like parts throughout the several figures.

Referring now to the drawings, in Figures 1 and 2 I have shown a ground floor and a typical floor of a building for storing automobiles. I have selected for these views a narrow building as being one of the most difficult buildings to use for storing automobiles efficiently, the narrow building being taken for purposes of illustration, it being of course evident that buildings of any widths, lengths and heights can be used. Referring now to the building 1, I have shown a central passageway 2 through the building so that the automobiles may enter and pass out without interference. On the ground floor I have shown a landing platform 3 for passengers. When the automobiles come into the building the passengers step onto this platform from the automobiles and then pass out of the building. When they desire to take the automobile out of storage, they walk in on this platform, the automobile is brought down, and they step into it.

Located in the building are one or more elevators 4 by means of which the automobiles are taken to the upper stories. When the automobiles come into the building they are placed upon trucks 5 and handled by these trucks. These trucks are arranged so that they can be moved under the automobiles. I have shown in Figs. 1 and 2 for purposes of illustration an automobile 6, the automobile being shown diagrammatically. The truck 5 is moved under the automobile as shown in Fig. 1, the automobile lifted by the truck from the floor and the automobile the moved into the elevator and out to the storage space as will be hereinafter more fully set out.

One form of truck for handling the automobiles is shown in Figs. 3 to 20. This truck is provided with four wheels 7, one at each corner, said wheels arranged to be rotated to move the truck, said wheels being also arranged to rotate about a vertical axis to change their position so as to change the direction of movement of the truck. In the particular construction shown each wheel 7 is fastened to a shaft 8 (see Fig. 12) rotatably mounted in a movable support 9. Means is provided for moving the support 9 to various positions and for rotating the wheels 7 in all the various positions of the support. In the construction shown, the movable support 9 is mounted in a frame piece 10 and is provided with a gear 11 which is shown as a worm gear, each wheel being provided with one of these gears. Connected with the gear 11 of each wheel is a driving device 12 which in this case is shown as a worm. This worm 12 is fastened to a short shaft 13 which is provided with a pinion 14 (see Fig. 8) driven by a pinion 15 on a shaft 16. This shaft 16 has a bevelled pinion 17 which engages a bevelled pinion 18 on the steering rod 19 having a non-circular shank 19$^a$ which fits into a socket in the removable steering rod section 19$^b$ provided at one end with a steering wheel 20 (see Figs. 4 and 5). In order to facilitate the steering of the truck I prefer to provide a steering wheel and rod at each corner of the truck and arrange means so that any one steering rod section 19$^b$ can be used at any corner to control all of the wheels of the truck. In order to secure this result the shaft 16 (see Fig. 3) extends across the truck and drives the worms of the two front wheels of the truck. There is a connection to the rear wheels consisting of a shaft 21 splined to a hollow shaft 21$^a$. The shaft 21 is provided with a bevelled gear 22 which engages the bevelled gear 23 on the shaft 16. The hollow shaft 21$^a$ has a bevelled gear 24 at its end which engages a bevelled gear 25 on the shaft 16$^a$ which shaft by means of pinions 15 drives the shafts 13 and worms 12 of the rear wheels. It will thus be seen that by rotating any one of the steering rods 19 all of the wheels of the truck can be controlled. The steering rods are preferably mounted in brackets 26 which rotate about the shafts 16 and 16$^a$ (see Fig. 6). These brackets are provided with slots 27 in which works a fixed pin 28. The brackets are provided with notches 29. A pawl 30 has an end which fits in these notches and is normally held therein by a spring 30$^a$ and is adapted to be controlled by the foot. This permits the steering rods to be moved down out of the way when desired by simply releasing the pawl 30 from the lower notch and moving the bracket 26 down so that the pawl engages the upper notch. The movable supports 9 are preferably provided with ball bearings 9$^a$ (see Figs. 10 and 12). I prefer to provide an indicator or pointer 31 connected with the movable piece 9 which indicates the position of the wheels 7. I also prefer to provide the movable support with an oil receptacle 32 by means of which the various bearings may be oiled through suitable oil passageways.

Some means is provided for driving the wheels 7 of the truck. As herein shown (see Fig. 12) the shafts 8 with which the wheels 7 are connected are provided with bevelled gears 33 which engage bevelled gears 34 rotatably mounted on the movable support 9. It will thus be seen that when the gears 34 are rotated the wheels 7 will be rotated on their horizontal axes. In the construction shown, these bevelled gears 34 are rotated as follows. Engaging each bevelled gear 34 is a bevelled gear 35 mounted on a short shaft 36 (see Figs. 8, 11 and 12). The short shafts 36 are driven from the driving shaft 37 in any suitable manner. As herein shown this is done by means of a chain or belt 38 which engages suitable wheels on the shafts 36 and 37. The shaft 37 (see Figs. 8 and 11) is provided with a bevelled gear 40 which engages a bevelled gear 41 on a short shaft 42 which has a worm wheel 43 which engages a worm 44 on the motor shaft 45 of the motor 46. It will thus be seen that when the motor 46 is operated the driving shaft 37 and hence the shaft 36 and bevelled gear 35 will be rotated and this will rotate the bevelled gear 33 and the shaft 8 and hence the wheel 7. The shaft 37 extends across the truck (see Fig. 20) and there are similar connections from it to each of the wheels at opposite sides of the truck. There is a similar motor 46ª at the other end of the truck (see Figs. 3 and 20) which drives a shaft 37ª which has similar connections to the other wheels of the truck. It will thus be seen that if the motor 46 is operated the front set of wheels will be rotated about their horizontal axes to move the truck and that when the motor 46ª is in operation the wheels at the other end of the truck will be rotated to move the truck. These motors are controlled as hereinafter set out.

The frame pieces 10 which form the corners of the truck in the particular construction shown are connected together in any suitable manner. As herein shown they are connected together by the end members 47 and the side members 48, said members being preferably made up of plates or the like so as to secure a light, strong construction.

The end members 47 carry the motors 46 and 46ª. The side members 48 are connected together by the connecting pieces 49. The corner frame pieces 10 are movable and can be moved outwardly away from the side pieces 48 but in alignment therewith as will be hereinafter more fully explained. Connected with these frame pieces are the engaging pieces 50 which are adapted to be forced under the wheels of the automobile to lift it from the ground. These engaging pieces are pivotally mounted by pivots 51 upon the ends 52 of the rack bars 53 (see Fig. 9). These rack bars are moved in and out by means of pinions 54 on the shafts 55.

The rack bars 53 work in guides in the corner frame pieces 10 as shown in Figs. 11 and 12. These rack bars are provided on their sides with grooves 56 in which work the rollers 57 rotatably mounted in the corner frame pieces 10. The frame pieces as herein shown have plates 58 bolted thereto (see Figs. 9, 11 and 12), which cover up the grooves in the frame pieces 10 so as to hold the rack bars 53 in place. By removing these plates the rack bars are accessible. It will be seen that by rotating the pinions 54 in one direction the rack bars and hence the engaging pieces 50 will be pushed out so as to engage the wheels of the automobile and lift them from the floor and when said pinions are rotated in the opposite direction the rack bars and hence the engaging pieces 50 will be retracted to the position shown in Fig. 3. The pinions 54 are operated as hereinafter described.

When automobiles with a short wheel base are to be loaded on the truck the truck is moved under the automobile and the rack bars moved out so as to cause the engaging pieces 50 to engage the wheels and lift them from the floor. When cars with a long wheel base are to be lifted, in order to prevent the long leverage on the rack bars the frame pieces 10 are moved outwardly the desired distance and then the rack bars are moved as before set out. These frame pieces are moved outwardly by having the motors 46 and 46ª operating in opposite directions and the wheels 7 connected therewith. Under these conditions one set of frame pieces moves out in one direction and the other in the other direction. There must, however, be some equalizing mechanism arranged so that when the movement is completed the frame pieces at each end will be equally distant from the ends of the side members. I have illustrated one mechanism for this purpose as follows. As herein shown, these corner frame pieces carrying the wheels 7 have connected with them suitable rack bars by means of which they may be moved. In the construction shown, said corner frame pieces have connected with them the channel shaped members 59 (see Figs. 10, 16, 17 and 18). These channel shaped members have connected to their sides the grooved bars 60 in which work the rollers 61 connected with the side pieces 62 of the side members, said rollers acting as friction reducing supports when the corner frame pieces are moved. Connected with the channel shaped members 59 are rack bars 63 which engage a gear 64 mounted on a shaft 65 carried in bearings 66 connected with the side pieces 62. It will be noted that when the gears 64 are rotated the channel shaped members 59 are moved outwardly equally so as to move the corner frame pieces 10 outwardly the desired distance, as for example to the position shown in Fig. 6. The gear 64 is held against rotation by some suitable mechanism so as to hold the parts in any desired position. As herein shown, a tooth engaging part 67 is slidably mounted in a holder 68 and is controlled by a bell crank lever 69, one end of which enters an opening in the tooth engaging part. The other end of the bell crank lever is connected with a core 70 of the solenoid 71. In view of the fact that the gear 64 should be locked most of the time and needs to be unlocked only on special occasions such as when it is desired to move out the frame pieces 10, I have arranged the parts so that the tooth engaging part normally engages the teeth of the gear and is held in such engagement by means of any suitable spring such as the spring 72. When it is desired to disengage the tooth engaging part from the gear the solenoid is energized, thus pulling down its core against the tension of the spring 72 and rocking the bell crank lever 69 so as to move the tooth engaging part 67 out of engagement with the gear. When it is desired to lock the gear the solenoid is deenergized and the spring 72 moves the core of the solenoid back to its initial position and moves the tooth engaging part 67 into engagement with one of the teeth of the gear 64.

The solenoid 71 and associated parts are mounted upon the bracket 73 (see Fig. 18), which projects between the upper and lower grooved bars 60 and is attached to the side pieces 62.

When the device is placed under an automobile with a long wheel base the frame pieces 10 must first be moved outwardly. This is done by operating the motors 46 and 46ª in opposite directions and connecting them with the wheels 7, and moving the tooth engaging parts 67, out of engagement with the gear 64. It will be readily understood that it would be somewhat difficult to place the device exactly under the middle of the car so that the frame pieces 10 at each end would only be required to be moved out of the same distance to bring them in proper position with relation to the wheels. With the construction herein shown this is not necessary because if the device is nearer one set of wheels than the other and one set of frame pieces 10 strikes the wheels first so that it cannot be moved farther out, as shown for example in Fig. 19, this will cause the side members 48 to move in the direction of the other set of wheels until the frame pieces 10 come into the proper position, and when in this position these frame pieces will project substantially the same distance from the ends of the side members.

This equalization of projection of these frame pieces is brought about by the construction wherein the shaft of the gear 64 is connected with the side members 48, for when one set of frame pieces are stopped by the wheels so as to produce a resistance the continued rotation of the gear 67 causes such gear to travel along one of the rack bars for the frame pieces, thus carrying the side members with it, the rack bars of the other set of frame pieces being projected only half as fast as they would be if the side members were stationary, the result being that when both sets of frame pieces are in proper relation to the wheels the side members are under the middle of the car and the frame pieces project therefrom substantially equal amounts. This permits the device to be placed under the car in any position and obviates the necessity of careful placement thereof, thus making it easy for anyone to use the device.

The gear 64 and the racks 59 in addition to acting as an equalizing mechanism for securing equal projection of the racks at each end of the device also act as a locking device. When the engaging pieces 50 are being pushed under the wheels of the automobile there is a backward pressure which tends to move the frame pieces 10 towards each other but when the tooth engaging piece 67 engages the teeth of the gear 64 this locks the parts against movement due to this pressure and holds the frame pieces in their proper position. When this tooth engaging part is in position it also locks the frame pieces 10 when the truck is moved from one place to another.

I may connect the various parts of the operating mechanism with the motors in any suitable manner. I prefer, however to make the device more or less automatic and for this purpose I have shown a series of electrically controlled clutches for making the various connections. These clutches I have shown as controlled by solenoids. In Fig. 20 I have shown the wiring diagrammatically so as to make the explanation clear.

Referring now to the mechanism which connects the wheels 7 with the motor, I will describe one such mechanism, it being understood that the mechanisms of the four corners are alike. One of the clutches and controlling solenoids for this purpose is shown in Figs. 8, 12, 14 and 15. When the motor (in this instance the motor 46) is operated, the belt 38 (see Fig. 8) is operating and this operates the sprocket wheel 74 (see Fig. 12) which is rotatably mounted upon the stub shaft 75. This shaft 75 is connected with shaft 36 by a clutch which consists of the member 76 attached to the sprocket wheel 74 or the shaft 75 (see Fig. 12). This member rotates at all times while the motor is rotating and cooperates with the non rotating clutch member 77. The clutch member 76 has pivoted therewith movable members 78 (see Fig. 15) having the springs 79 connected with the ends thereof, which tend to move them inwardly towards each other so as to cause the engaging projections 80 thereon to engage the engaging members 81 on the shaft 36 (see Fig. 15). The movable members 78 have on their faces inclined projections 78ª (see Figs. 12 and 15). The clutch member 77 has an annular projection 77ª having an inclined face engaging the inclined faces of the projections 78ª (Fig. 12). When the clutch member 77 is moved to the right the annular projection 77ª engaging the bevelled faces of the projections 78ª move the movable engaging members 78 about their pivots so as to disconnect them from the engaging projections 81 and hold them in this position, thus disconnecting the stub shaft 75 and the shaft 36. When the engaging projections 80 engage the engaging projections 81, the stub shaft 75 and the shaft 36 are operatively connected and this operatively connects the wheel 7 with the motor. The other wheels are connected in a similar manner by similar mechanism. The clutch member 77 is controlled by a bell crank lever 82 (see Fig. 12) having a bifurcated arm 83 (see Fig. 14) which has pins 84 which engage the clutch member 77. The bell crank lever 82 is connected with the core 85 of the solenoid 86. When this solenoid is energized the bell crank lever 82 is moved so as to move the clutch members 77 to the left (Fig. 12) so as to cause the annular projection 77ª to disengage the member 78 whereupon said members are moved about their pivots and engage the projections 80, thereby connecting the shaft 36 with the motor. When the solenoid 86 is deenergized the springs 77ᵇ move the member 77 to the right (Fig. 12) so as to disengage said members 78 from the engaging projections 81, thereby disconnecting the shaft 36 from the motor. The engaging projections 80 are so shaped that when they are moved out to become disengaged from the projections 81 they fall away from such projections so that there will be no frictional resistance, thus making this movement easy. I have shown the solenoids 86 so that when they are energized the clutches they control are in such position as to connect the wheels 7 with the motor but I may arrange these solenoids to work just the opposite way—that is, so that when they are deenergized the clutch is in such position as to connect the wheels 7 with the motor and when they are energized the clutches move to disconnect the wheels 7 from the motor.

The engaging parts 50 which engage the wheels of the automobile are moved out by the following mechanism. The motor shaft 37 (see Fig. 11) has keyed to it the sprocket wheel 88 which drives the chain or belt 38. This shaft has associated with it a clutch having a clutch member 88. The shaft 55 which carries the pinions 54 which engage the rack bars 53 connected with the engaging pieces 50 is provided with a non rotating clutch member 90 which has pivotally connected therewith the movable engaging members 91 to which are connected the springs 92. The members 91 are provided with the engaging projections 93 which are adapted to engage the engaging projections 94 on the shaft 55, and are also provided on their faces with projections 91ª having bevelled faces (Fig. 11). The clutch member 90 is provided with an annular projection 90ª which has a bevelled face which engages the bevelled faces of the projections 91ª when the member 90 is moved to the right (Fig. 11) thus moving the members 91 about their pivots so as to disengage them from the engaging projections 92 on the shaft 55. The clutch member 90 is held in this disengaging position by the springs 90ᵇ. The clutch member 90 is moved by means of a bell crank lever 95 (see Figs. 11 and 14). One end of this bell crank lever consists of a bifurcated arm 96. This bifurcated arm is provided with pins 97 which engage the clutch member 90. The bell crank lever is controlled by a solenoid 98 (see Fig. 11). When the solenoid is energized the bell crank lever is moved to move the clutch member 90 to the left (Fig. 11) so as to release the members 91 and permit them to engage the projections 92, thus connecting the shaft 55 with the motor. When the solenoid is deenergized the springs 90ᵇ move the member 90 so as to move the members 91 out of engagement with the projections 92, thereby disconnecting the shaft 55 from the motor. The rotation of this shaft moves the rack bars 53 and the engaging parts 50, the direction of motion depending upon the direction of rotation of the motor. It is understood of course that there is a solenoid and clutch arrangement for each one of the engaging devices 50.

In Figs. 25 to 32 I have shown a construction whereby the truck can be moved or rotated about a vertical axis through its center and at the same time all of its wheels 7 can be controlled by any one steering wheel. In this construction some means must be provided for moving the wheel 7 at one end of the truck to opposite inclinations as shown for example in Fig. 28. One means of securing this result consists of dividing the shaft 16 which is operated by the hand wheel into two sections adapted to be connected together or disconnected. I have shown the shaft 16 having the worms 12 directly thereon. At the point where the shaft 16 is broken I provide bevelled gears 99 and 100. These bevelled gears are splined to the shaft and are adapted to be moved towards and from each other. Connected to these gears are the engaging teeth or members which are connected together when the gears are moved towards each other so as to make both sections of the shaft rotate together. Located between these gears is another bevelled gear 103 which is slidable upon a short shaft 104. Connected with the hub of the gear 103 is a bifurcated shifting lever 105 (see Fig. 30). This shifting lever engages the spring member 106 which tends to hold it against movement and is connected with a shaft 107. As shown in Fig. 29, for example, the spring member 106 has openings 106ª and 106ᵇ and the shifting lever 105 has a projection 105ª. When the shifting member is in one position this projection enters one of these openings and when in the other position this projection enters the other opening and this prevents the accidental movement of the shifting lever. This shaft extends to the sides of the truck and at each end has connected therewith, the foot lever 108 (see Figs. 28 and 32). The gears 99 and 100 are provided with bell crank shifting levers 109 and 110 which are connected with the rings 111 and 112 on the hubs of the gears 99 and 100. These shifting levers are also connected with the hub of the gear 103 (see Figs. 28 and 30) so that when the gear 103 (see Fig. 28) is moved to the right the gears 99 and 100 will be moved towards each other to connect the two sections of the shaft 16 together and when the gear 103 is moved to the left the gears 99 and 100 will be separated by the shifting devices so that the gear 103 will pass in between them and engage them as shown in Fig. 28.

I make the connection between the shifting levers 109 and 110 and the hub of the gear 103 in such manner as to permit the gear 103 to be moved a short distance from between the gears 99 and 100 before said latter gears are moved towards each other. This is accomplished by providing separate members 113 and 114 which are connected to the rotating ring 115 in the hub of the gear 103 and which are connected respectively with the shifting levers 109 and 110 by means of a pin and slot connection as shown at 116, one of the members having a pin and the other a slot so that there is a certain amount of lost motion before the gears 99 and 100 begin to move towards each other. When it is desired, for example, to move the wheels 7 keeping them parallel to each other, the operator puts his foot on the end 117 of the lever 108 and this through the shifting lever 105 moves the gear 103 out from between the gears 99 and 100 and moves said latter gears towards each other to connect the engaging parts 101 and 102. The two sections of the shaft 16 are then connected so that when the steering wheel is rotated they will be rotated together, that is, as one shaft, and the wheels 7 will be moved in parallel relation. This arrangement is shown in Fig. 25. When it is desired to move the wheels 7 to an angular relation as shown for example in Fig. 28, the operator puts his foot upon the end 118 of the lever 108 and this moves the shaft 107 and shifting device 105 so as to separate the gears 99 and 100 and insert between them gear 103 so as to mesh therewith. If now the steering wheel is turned, the two sections of the shaft 16 will be rotated in opposite directions and this will move the wheels to the desired angular position. When they are in the angular position shown in Figs. 27 and 28 they will move in an arc of a circle or a complete circle, the center of which is the vertical central axis of the truck. The motors at the two ends must of course be rotated in the proper direction to rotate all of these wheels in a direction indicated by the arrow in Fig. 27. In Fig. 25, for example, the wheels 7 are shown so that the truck may be run in a straight line in either direction, that is toward or away from the top of the sheet. In Fig. 26 the wheels 7 are turned at right angles so that the truck can be run in a direction at right angles to that it is running in in Fig. 25, while in Fig. 27 the wheels are turned at an angle to each other and in such position that the truck can be rotated in a circle about its central vertical axis.

When it is desired to turn the wheels as shown in Fig. 27 to run in a circular direction they are first turned to the position shown in Fig. 25 and then the foot lever is pressed and the wheels are then turned to the position shown in Fig. 27. This only requires the wheels to be turned a small amount, that is through an angle of forty-five degrees, as will be seen by comparing Fig. 27 with Fig. 25 and noting the distance the bevelled gears 33 have been moved. If the two motors are now run in the reverse directions, as indicated by the arrows in Fig. 27, the entire truck will be moved in a circular direction about its central vertical axis. If, now, it is desired to run the truck in the ordinary way in straight lines, the steering wheel must be moved so as to turn the wheels back to the parallel positions as shown in Fig. 25 before the foot lever is pressed to disengage the gear 103 from the gears 99 and 100 and connect the two parts of the shaft 16 together. The reason for this is that when the two sections of shaft 16 are connected together the rotation of the hand wheel always moves the associated wheels in parallel relation and hence to operate properly they must first be put in parallel relation before being controlled in this manner. Fig. 25 shows the wheels when the truck is moving in one straight line position and Fig. 26 when they are moving in a straight line position at right angles thereto. These positions and any intermediate positions are brought about when the two parts of the shaft 16 are connected together. As the frame pieces 10 are moved out the wheels must be moved to different angles in order to rotate the truck about its central vertical axis. This is due to the fact that the wheels when the frame pieces are moved out do not move out radially but move in a straight line forward or backward. The operator cannot properly position these wheels simply by the indicator 31 because he does not know the angular position they must be placed in these various positions. Some means must therefore be provided for indicating the correct position of these wheels, to secure the circular rotation in the various positions of the frame pieces. I have shown one means for this purpose. In this construction the indicators 31 which are connected with the wheels 7 to indicate their position each have associated therewith a second indicator 120. The indicators 31 are fixed with relation to the wheels whereas the indicators 120 are movable and are preferably mounted upon a pivot 121. These indicators each have an inwardly projecting arm 122 which is connected by a flexible connecting piece 123 with a spool or drum 124 located at the center of the truck as shown for example in Fig. 28. There are four or these indicators 120, one for each wheel, all four being connected by the flexible connecting device with the spool or drum 124. This spool or drum is preferably provided with a spring or other suitable device which automatically winds the flexible connecting pieces 123 thereon when the frame members are moved toward the center of the truck permits their automatic unwinding when the frame pieces 10 are moved away from the center of the truck. With this construction when the frame pieces 10 are moved out the indicators 120 since they are connected with the center of the truck will always be in the position in which the wheels must be placed to secure the circular motion and hence whatever the position of the frame pieces 10 it is only necessary to move the wheels 7 so that the indicator 31 is parallel with the indicator 120 and when this is done and the wheels 7 rotated the truck will rotate about its central vertical axis. I may make these two indicators of different colors so as to make it easier to manipulate them and to see when they are in proper parallel relation.

The motors are controlled by any of the ordinary controllers, one of which I have shown at 125, Fig. 20, this being shown as a double controller, the circuits being controlled by the levers 126 and 127. The motors are connected to any desired source of electrical supply. When the levers are moved away from each other as shown in full lines in Fig. 20 the motors are rotated in opposite directions. This is the position of these levers when the frame pieces 10 and the engaging pieces 50 are moved out. When the levers are moved towards each other as shown in dotted lines in Fig. 20, the directions of rotation of the motors are reversed but they are still rotating in opposite directions. When it is desired to have the motors rotate in the same direction the two levers are moved so as to be parallel, that is, in the position indicated by one dotted line lever and one full line lever in Fig. 20. I prefer to provide an automatic arrangement by means of which when the frame pieces 10 and the wheel engaging pieces 50 are moved out they will be automatically stopped when they reach the proper limit of their movement necessary to lift the automobile from the floor. I have shown one arrangement of electrically securing this result, the circuits being shown diagrammatically in Figs. 20 to 24 inclusive. In this construction the solenoids 85 and 98 are controlled by the push buttons 128 and 129. I prefer to provide an automatic push button arrangement, one form of which is shown in Fig. 24. In this construction the push button 128 is connected by the bar 130 with the cores 131 and 132 of the solenoids 133 and 134. These cores are adapted to cooperate with electrical contacts 135 and 136. By means of the push buttons these cores are pushed into contact with electrical contacts 135 and 136 and this completes the circuit through the solenoids 86 and 133 and 134. The solenoids 133 and 134 then hold these cores in their circuit completing positions. When the solenoids are deenergized the cores are retracted by the springs 137 and 138.

The push button 129 for controlling the solenoids 98 and the clutch which causes the wheel engaging parts 50 to be moved out is arranged in a manner similar to the push button 128. It is connected with the bar 139 (see Fig. 20) which bar is pivotally connected with the cores 140 and 141 of the solenoids 142 and 143, the movement of the cores of which connects the contacts 144 and 145.

Referring now to the circuits for the solenoids 86 (see Figs. 20 to 23) and starting from the source of electric supply 147, this source of electric supply is connected by a conductor 148 which leads to the point 149 where it divides, one branch 150 going to one solenoid 86 and the other branch 151 leading to the other solenoid 86 at the same end of the truck. A conductor 152 leads from this solenoid and joins with a conductor 153 leading from the first-mentioned solenoid and which is connected with a switch 154 which in this instance is shown diagrammatically as a pivoted arm. This switch cooperates with contacts 155 and 156 which are connected together by a conductor 157, said conductor being connected by a conductor 158 with one of the contacts 136. The other contact 136 is connected with the coils of the solenoids 133 and 134 and these coils are connected by conductor 159 with the source of electric supply 147.

Referring now to the circuits at the right hand end of Fig. 20, one of the contacts 135 is connected by a conductor 160 with conductor 161 which connects to the contacts 162 and 163 over which moves the switch 164. Connected with this switch is a conductor 165 which leads to the point 166 where it divides, a portion 167 leading to the solenoid 86 at the upper part of the sheet. This solenoid is connected by a conductor 168 with the source of electric supply 147. The other part of the conductor which branches at 166 consists of the conductor 169 which leads to the solenoid 86 at the bottom of the sheet and this solenoid is connected by a conductor 170 with the conductor 168 which leads back to the source of electric supply.

Referring now to the circuits for the solenoids 98 controlled by the push button 129 the coils 142 and 143 of the solenoids of said push button are connected by a conductor 171 with the conductor 148. The two coils 142 and 143 are connected together. One of the contacts 145 is connected by a conductor 172 which leads to the point 173 where it divides, one conductor 174 leading to the contacts 175 and 176 of the switch 177. A conductor 178 leads from this switch to the solenoid 98 at the bottom of the sheet and this solenoid is connected by a conductor 150 with the conductor 148. Leading from the point 173 is a conductor 179 which connects with the solenoid 98 at the top of the sheet and running from this solenoid is a conductor 180 which connects with conductor 148.

Referring to the right end of this diagram, one of the contacts 144 is connected to conductor 181 which leads to the point 182. A conductor 183 leads to the contacts 184 and 185 of the switch 186 and a conductor 187 leads from this switch to the solenoid 98 at the bottom of the sheet and this solenoid is connected by conductor 170 with the conductor 168. Leading from the point 182 is a conductor 188 which leads to the solenoid 98 at the top of the sheet and this solenoid is connected by conductor 189 with the conductor 168.

Referring now to Fig. 21 which shows the circuits for one of the solenoids 86 and one of the solenoids 98 before the frame pieces 10 are moved out, when it is desired to move the frame pieces 10 out the solenoids 71 which control the tooth engaging part 67 for the wheel 64 (Fig. 10) is energized so as to release the wheel 64. The push button 128 is pushed and that connects the contacts 136 so as to complete the circuit. The current then passes from the source of supply 147 along conductor 148 through the coils of solenoids 133 and 134, thence through contacts 136 to conductor 158, thence through conductor 157 to switch 154, thence by the conductor 153 to solenoid 86, thence by conductor 150 to conductor 148 and thence back to the source of supply. This energizes the solenoid 86 which moves its associated clutch to connect the wheel 7 with the motor. All of the solenoids 86 are energized but to make the explanation clear I will describe the action of one. The motors being in operation in opposite directions, the frame pieces 10 now move out as shown in Fig. 22 until the switch 154 strikes the wheels whereupon the switch is moved from contact 155 to contact 156. During this movement the circuit is momentarily broken through the coil 133 of the push button solenoid and the spring 138 then moves its core back to break the circuit between contacts 136. The two solenoids 86 at the same end of the truck are now deenergized and the clutches are moved to disconnect the wheel 7 from the motor and stop the further outward movement of the frame pieces 10. If, for example, one set of frame pieces 10 strikes one set of the automobile wheels before the other set as shown for example in Fig. 19, then the switch 154 at that end causes the solenoids 86 at that end to become deenergized so as to disconnect the wheels 7 from the motor at that end. The construction of the push button solenoid as shown in Fig. 24 permits the deenergizing of the solenoids 86 at one end without deenergizing the solenoids at the other end for if the current is momentarily broken through one of the push button solenoids 133 or 134 the spring associated with the core of that solenoid is at once retracted to open the circuit through the solenoids 86 at one end whereas the other push button solenoid being energized holds its core so that the circuit through the solenoids 86 at the other end of the truck will remain in the circuit and energized. The pivotal and link connection between the cores of these two push button solenoids and the springs 130 and 137 permit this movement of one without the other so as to stop the projection of one set of frame pieces when they strike the wheels without stopping the projection of the other set which has not yet engaged the wheels. The motor at the other end continues to drive and by means of the equalizing wheels 64 the entire body portion of the truck is moved toward the left (Fig. 19) while the frame pieces 10 at the left are simultaneously moving out, the wheels 64 riding along one of the racks and carrying with it the main body portion of the truck so that when the switch 154 at the other end (in Fig. 19 the left end) is moved by the automobile wheels at the left, the two sets of frame pieces will be projected equally, the main body of the truck being substantially under the center of the automobile.

The push button 129 is now pushed so as to complete the circuits for the solenoid 98.

Referring now to Fig. 22, this completes the circuit between contacts 145 and the circuit is traced as follows: From the source of electric supply along conductor 148 through coil 143 of the push button solenoid, through contacts 145 and thence through conductor 172 to conductor 174, thence through to contact 175 and switch 177, thence through conductor 178 to solenoid 98, thence by the conductor 148 back to the battery. This energizes all of the solenoids 98 and I am describing the action of one for purposes of explanation. The solenoids 98 now move their clutch members so as to connect the shaft 55 with the shaft 37 (Fig. 11) and operate the pinions 54 to engage the racks 53 of the engaging parts 50. The motor now being in operation causes these racks and the engaging pieces 50 to move out. Connected with one of these racks is a switch controlling member 192 which has a part 193 which engages the switch 177 when in one position and another part 194 which engages the switch 177 when the parts are in another position. The racks 153 moving out now cause the engaging pieces 50 to move under the wheels and lift the automobile. When these racks have moved out the proper distance, the part 194 engages the switch 177 and moves it out of contact with the contacts 175 and into contact with contact 176 as shown in Fig. 23 and this breaks the circuit momentarily through the push button solenoid 143 and the spring which controls it disconnects the contacts 145 and this permanently breaks the circuit and deenergizes the solenoids 98 and this disconnects all of the racks and engaging pieces 50 from the motors and stops their movement. The push button 128 is now pushed so as to again energize the solenoids 86 and connect the wheels 7 with the motors and the truck is then moved to any point desired and into the space where the automobile is to be stored. If the space is on a different floor the truck is run on the elevator, moved to the proper floor, moved off, and then moved to the desired storage space, the steering being done by any one of the steering wheels. When the automobile is deposited in the proper storage space the machine is stopped and the push buttons 148 are now pushed, the motors being controlled to move in the proper direction, and this energizes the solenoids 98 and connects the racks 53 and the engaging pieces 50 with the motors and they are then retracted from beneath the wheels of the automobile, depositing it on the floor. When the retraction of the racks is complete the part 193 of the switch controlling piece 192 engages the switch 177 (see Fig. 21) and moves it out of contact with contact 176 and into contact with contact 175. This momentarily breaks the circuit through the push button solenoid 143 and its spring retracts its core so as to separate the contacts 145 and permanently open the circuit, and the further retraction of the engaging pieces 50 is stopped. The solenoids 71 (Fig. 10) are again energized to unlock the wheels 64.

The circuits through the solenoids 86 being completed and the motors in operation in the reverse direction, the frame pieces 10 will now be retracted. When these frame pieces are retracted to their initial positions the switch controlling pieces 195 (Fig. 21) engage the switches 154 and disconnect them from contacts 156 and move them into contact with contacts 155. This momentarily breaks the circuit and the push button solenoid then acts permanently to break the circuit, thus stopping the retraction of the frame pieces 10. The solenoids 71 are then deenergized so as to lock the wheels 64 and hold the frame pieces 10 in their retracted positions. The push button 128 is then moved to again operate the solenoid 86 to actuate the clutches so as to connect the wheels 7 with the motors. The truck is then moved out from under the automobile and may either be returned with another automobile to the ground floor or sent back for another automobile. The solenoid 71 for unlocking the wheel 64 may be controlled by any suitable means and from any desired point. In Figure 20, I have shown diagrammatically a simple means for this purpose. In this construction I provide a source of electric supply 198 located at any suitable point and connected by a conductor 199 with one of the solenoids 71 and by a conductor 200 with a suitable switch which in this case is shown as a two button push switch. The conductor 200 being connected with a contact 201, there being a separated opposed contact 202 which is connected by a conductor 203 with the solenoid 71. The switch member 204 is pivoted at 205 and has the push buttons 206 and 207. When the button 206 is pushed the contacts 201 and 202 are connected together to complete the circuit and when the button 207 is pushed the member 204 disconnects these contacts and breaks the circuit. The conductors 199 and 203 are connected to the other solenoid 71 by the conductors 208 and 209 so that when the circuit is closed both solenoids will be energized and when the circuit is open both solenoids will be deenergized. The controlling push buttons 128 and 129, 206 and 207 may be located at any desired point or points. They may for example be connected with the steering wheel 20 as seen, for example in Figures 4, 5, 6 and 7.

It will be noted that in this device the truck is normally shorter than the wheel base of the automobile and that it is moved between the wheels to a position beneath the automobile and is provided with extensible members, with means for extending the members to cause them to engage the wheels of the automobile and lift it so that it will be supported by the truck.

It will further be noted that the truck has the vehicle wheel engaging portion carried by a support for movement therewith and with respect thereto and that there is provided means for selectively controlling the relative movement of the respective parts, there being power mechanism to move those parts.

It will further be noted that the automobile is moved on and off the truck while the automobile is stationary and without the necessity of moving the automobile and that the entire operation of putting the automobile on the truck, carrying it to the storage space and depositing it therein or moving it therefrom, are all done without causing the automobile to be moved by its own power or upon its own wheels.

It will further be noted that the device is adjustable for all sizes of automobiles, is under perfect control, is easily handled and can be moved and manipulated in small spaces.

In the specification and claims, I have used the word automobile but I do not use it in its limited sense but use it to cover any vehicle or the like for which the invention herein set forth is adaptable.

I have described in detail a particular construction embodying the invention but it is, of course, evident that the parts may be varied without departing from the spirit of the invention as embodied in the claims hereto appended and I therefore do not limit myself to the particular construction shown.

I claim:

1. An apparatus for handling automobiles comprising a main body portion, frame pieces connected with said body portion, wheels mounted in said frame pieces, means for moving said frame pieces toward and from the body portion, and wheel engaging pieces carried by said frame pieces adapted to engage the wheels of the automobile so as to lift the automobile and support it.

2. An apparatus for handling automobiles comprising a main body portion, frame pieces connected with said body portion, wheels mounted on said frame pieces, means for moving said frame pieces toward and from the body portion, and wheel engaging pieces carried by said frame pieces adapted to engage the wheels of the automobile so as to lift the automobile and support it, said wheel engaging pieces movably mounted in said frame pieces, and means for extending them beyond the frame pieces to project them under said wheels.

3. An apparatus for handling automobiles comprising a body portion, extensible members connected with said body portion supporting wheels mounted on said extensible members, means for driving said wheels in all their various positions, engaging pieces mounted on said extensible members and adapted to engage the wheels of the automobile and lift them so that the automobile will be supported thereon.

4. An apparatus for handling automobiles comprising a body portion, extensible members connected with said body portion, supporting wheels mounted on said extensible members, means for driving said wheels in all their various positions, extensible engaging pieces mounted on said extensible members, and means for extending said engaging pieces to force them under the wheels of the automobile so as to lift and support said automobile.

5. An apparatus for handling automobiles comprising a body portion, frame pieces extensibly connected with said body portion, a movable support carried by each frame piece and adapted to be moved about a vertical axis, a wheel rotatably mounted on each movable support, steering mechanism connected with said wheels, driving mechanism connected with said wheels for driving them in all their various positions, engaging pieces connected with said frame pieces and adapted to engage the wheels of the automobile to lift them and support the automobile thereon.

6. An apparatus for handling automobiles comprising a body portion, driving supporting wheels therefor, movable supports with which said wheels are connected, said supports rotatable about a vertical axis, driving connections for said wheels, means for steering said wheels, and engaging pieces extending beyond said wheels and adapted to engage the wheels of an automobile so as to lift them and support the automobile thereon.

7. An apparatus for handling automobiles comprising a body portion, frame pieces connected therewith, driving wheels mounted on said frame pieces, means for driving said driving wheels, overlapping racks connected with said frame pieces and projecting along the body portion, a toothed wheel interposed between the racks and engaging them, locking means for locking said toothed wheel against rotation, and engaging pieces connected with said frame pieces and adapted to be projected under the wheels of the automobile to lift it free of the surface upon which it rests.

8. An apparatus for handling automobiles comprising a body portion, extensible parts connected with said body portion, wheels upon which said extensible parts are mounted, mechanism for extending said extensible parts when the device is under an automobile, and means for automatically stopping said mechanism when the extensible parts strike the automobile wheels.

9. An apparatus for handling automobiles comprising a body portion, extensible parts connected with said body portion, wheels upon which said extensible parts are mounted, mechanism for extending said extensible parts when the device is under an automobile, and means for equalizing the extension of said extensible parts when the opposite extensible parts are unequal distances from the automobile wheels.

10. An apparatus for handling automobiles comprising a body portion, extensible parts connected with said body portion, wheels upon which said extensible parts are mounted, mechanism for extending said extensible parts when the device is under an automobile, and means for automatically stopping said mechanism when the extensible parts strike the automobile wheels, extensible engaging pieces connected with said extensible parts and adapted to be moved under the wheels of the automobile to lift it from the surface on which it rests and means for automatically stopping said extensible engaging pieces when the automobile has been lifted so as to be supported thereon.

11. An apparatus for handling automobiles and like vehicles and embodying a truck-like structure adapted to be positioned under a vehicle, a support carried by the truck for movement therewith and with respect thereto, a vehicle wheel engaging portion carried by said support for movement therewith and with respect thereto, and means for selectively controlling the relative movements of the respective parts.

12. An apparatus for handling automobiles and like vehicles and embodying a truck-like structure adapted to be positioned under a vehicle, a support carried by the truck and extensible with respect thereto, vehicle wheel engaging means carried by said support for movement therewith and for extension with respect thereto, mechanisms individual to the said support and wheel engaging means for moving them with relation to the truck and with respect to each other, power mechanism, and means for selectively connecting the said mechanisms with the said power mechanism.

13. An apparatus for handling automobiles and like vehicles and embodying a truck-like structure adapted to be positioned under a vehicle, a support carried by the truck for movement therewith and with respect thereto, vehicle wheel engaging means carried by the support for movement therewith and for extension with respect thereto, means for moving the parts, and means operating to automatically position the said truck substantially midway between the vehicle wheels when one of the said wheel engaging means contacts with its respective vehicle wheel at one end of the vehicle in advance of the engagement of the wheel engaging means with its respective vehicle wheel at the other end of the vehicle.

14. An apparatus for handling automobiles and like vehicles and embodying a truck like structure adapted to be positioned under a vehicle, a support carried by the truck for movement therewith and with respect thereto, vehicle wheel engaging means carried by the support for movement therewith and for extension with respect thereto, means for moving the parts, and means controlled by one of the vehicle wheels and operating to automatically position the said truck substantially midway between the vehicle wheels when one of the said wheel engaging means contacts with its respective vehicle wheel at one end of the vehicle in advance of the engagement of the wheel engaging means with its respective vehicle wheel at the other end of the vehicle.

15. An apparatus for handling automobiles and like vehicles and embodying a truck like structure adapted to be positioned under a vehicle, a support carried by the truck for movement therewith and with respect thereto, vehicle wheel engaging means carried by the support for movement therewith and for extension with respect thereto, means for moving the parts, means operating to automatically position the said truck substantially midway between the vehicle wheels when one of the said wheel engaging means contacts with its respective vehicle wheel at one end of the vehicle in advance of the engagement of the wheel engaging means with its respective wheel at the other end of the vehicle, and means for locking the second recited means against operation.

16. An apparatus for handling automobiles and like vehicles and embodying a truck like structure adapted to be positioned under a vehicle, a support carried by the truck for movement therewith and with respect thereto, means carried by the truck and co-operating with said supports for automatically positioning the truck midway between the ends of said supports when the latter are extended with respect to the truck, means for extending the supports, vehicle wheel engaging means carried with the supports for movement therewith and with respect thereto, and means for extending the said wheel engaging means with respect to the said supports.

17. An apparatus for handing automobiles and like vehicles and embodying a truck like structure adapted to be positioned under a vehicle, a support carried by the truck for movement therewith and with respect thereto, means carried by the truck and co-operating with said supports for automatically positioning the truck midway between the ends of said supports when the latter are extended with respect to the truck, means for extending the supports, vehicle wheel engaging means carried with the supports for movement therewith and with respect thereto, means for extending the said wheel engaging means with respect to the said supports, and means controllable at will for locking the first recited means against operation.

18. An apparatus for handling automobiles and like vehicles comprising a truck like structure adapted to be positioned under the vehicle, and having a body portion, a motor mounted on the body portion, extensible vehicle wheel engaging portions slidably connected with the body portion, and wheels upon which the vehicle wheel engaging parts are mounted.

19. An appaartus for handling automobiles and like vehicles comprising a truck like structure adapted to be positioned under the vehicle, and having a body portion, a motor mounted on the body portion, extensible vehicle wheel engaging portions slidably connected with the body portion, wheels upon which the vehicle wheel engaging parts are mounted, and means for operatively connecting the motor with said wheels in all their various positions.

Signed at Chicago county of Cook and State of Illinois, this 13th day of February 1923.

FREDERICK F. DINKELBERG.